United States Patent [19]

Serini et al.

[11] Patent Number: 5,134,220
[45] Date of Patent: Jul. 28, 1992

[54] POLYESTER AND POLYESTER CARBONATE BASED ON 3,8-DIHYDROXY-5A, 10B-DIPHENYLCOUMARANO-2',3',2,3-COUMARANE

[75] Inventors: Volker Serini; Hans-Josef Buysch, both of Krefeld; Ulrich Grigo, Kempen, all of Fed. Rep. of Germany

[73] Assignee: Bayer Aktiengesellschaft, Bayerwerk, Fed. Rep. of Germany

[21] Appl. No.: 670,888

[22] Filed: Mar. 18, 1991

[30] Foreign Application Priority Data

Mar. 29, 1990 [DE] Fed. Rep. of Germany ....... 4010029

[51] Int. Cl.$^5$ ................. C08G 63/16; C08G 64/06
[52] U.S. Cl. .................. 528/190; 528/176; 528/196; 528/201; 528/204
[58] Field of Search ............... 528/201, 196, 204, 190, 528/176

[56] References Cited

U.S. PATENT DOCUMENTS

| | | | |
|---|---|---|---|
| 3,763,219 | 6/1972 | Hay | 528/196 |
| 3,830,778 | 8/1974 | Arai et al. | 528/190 |
| 4,506,066 | 3/1985 | Medem et al. | 528/196 |
| 4,931,594 | 6/1990 | Knebel et al. | 568/727 |
| 4,990,588 | 2/1991 | Knebel et al. | 528/125 |

*Primary Examiner*—Harold D. Anderson
*Attorney, Agent, or Firm*—Joseph C. Gil; Aron Preis

[57] ABSTRACT

Polyesters and polyester carbonates of
a) aromatic diphenols,
b$_1$) aliphatic and/or cycloaliphatic and/or aromatic dicarboxylic acids and optionally
b$_2$) carbonic acid, containing
b$_1$) in a quantity of 0.1 to 100 mol-% and
b$_2$) in a quantity of 0 to 99.9 mol-%, based on (b$_1$+b$_2$), in which 0.1 to 100 mol-% of a) consists of 3,8-dihydroxy-5a,10b-diphenylcoumarano-2',3',2,3-coumarane corresponding to formula (I)

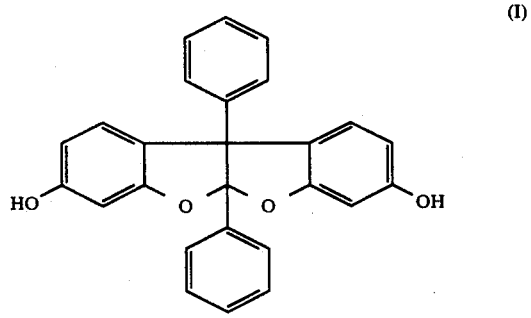

1 Claim, No Drawings

POLYESTER AND POLYESTER CARBONATE BASED ON 3,8-DIHYDROXY-5A, 10B-DIPHENYLCOUMARANO-2',3',2,3-COUMARANE

This invention relates to polyesters and polyester carbonates of
a) aromatic diphenols,
b₁) aliphatic and/or cycloaliphatic and/or aromatic dicarboxylic acids and optionally
b₂) carbonic acid,
containing
b₁) in a quantity of 0.1 to 100 mol-% and
b₂) in a quantity of 0 to 99.9 mol-%, based on (b₁+b₂), in which 0.1 to 100 mol-% of a) consists of 3,8-dihydroxy-5a,10b-diphenylcoumarano-2',3',2,3-coumarane corresponding to formula (I)

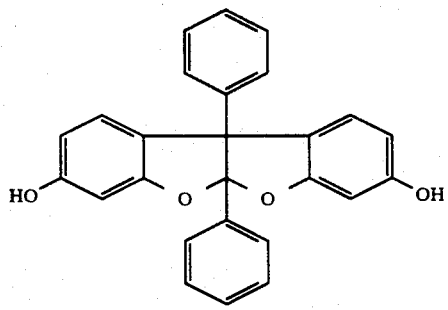

(I)

Compared with known polyesters and polyester carbonates, for example those of bisphenol A and of 1,1-bis-(4-hydroxyphenyl)-cyclohexane, the polyesters and polyester carbonates according to the invention have surprisingly good properties which are of considerable importance for industry.

Thus, even with small contents of co-condensed bisphenols corresponding to formula (I), they have surprisingly high glass temperatures $T_g$. They also show high resistance to thermal oxidation and high flame resistance.

The dihydroxy compound corresponding to formula (I) is known (cf. J. Am. Chem. Soc. 63, 580 (1941) (where the structure is wrongly assigned), Rec. Trav. Chim. 87, 599 (1968), DE-OS 3 804 988 and EP 0 314 007); it is prepared by condensation of benzil with resorcinol in the presence of acidic catalysts (for example sulfuric acid, acidic cation exchanger resins).

The following are examples of aromatic diphenols (component a) which may be used in addition to those of formula (I) for the synthesis of the polyesters and polyester carbonates according to the invention: hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, α,α'-bis-(hydroxyphenyl)-isopropylbenzenes, pentamethyl-(hydroxyphenyl)-indanols and corresponding ring-substituted compounds thereof.

These and other suitable aromatic dihydroxy compounds are described, for example, in the book by Herman Schnell entitled "Chemistry and Physics of Polycarbonates", Polymer Reviews 9, Interscience Publishers, New York, 1964; in V. Serini, D. Freitag and H. Vernaleken, "Polycarbonate aus o,o,o',o'-tetramethyl-substituierten Bisphenolen", Angewandte Makromolekulare Chemie 55 (1976), 175–189 and in U.S. Pat. Nos. 3,028,365, 2,999,835, 3,148,172, 3,271,368, 2,991,273, 3,271,367, 3,780,078, 3,014,891 and 2,999,846; in DE-OS 1 570 703, 2 063 050, 2 063 052, 2 211 957, 2 402 175, 2 402 176, 2 402 177 and in FR-PS 1 561 518.

Preferred other diphenols are hydroquinone, bis-(4-hydroxyphenyl), 2,2-bis-(4-hydroxyphenyl)-propane, bis-(4-hydroxyphenyl)-sulfide, bis-(4-hydroxyphenyl)-ether, bis-(4-hydroxyphenyl)-ketone, bis-(4-hydroxyphenyl)-sulfone, bis-(4-hydroxyphenyl)-methane, 1,1-bis-(4-hydroxyphenyl)-cyclohexane, α,α'-bis-(4-hydroxyphenyl)-p-diisopropyl benzene, 1,1-bis-(4-hydroxyphenyl)-1-phenyl ethane, 2,2-bis-(3-methyl-4-hydroxyphenyl)-propane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)-methane, 2,2-bis-(3,5-dimethyl-4-hydroxyphenyl)-butane, bis-(3,5-dimethyl-4-hydroxyphenyl) and 1,1,3,4,6-pentamethyl-3-(3,5-dimethyl-4-hydroxyphenyl)-indan-5-ol, more preferably bis-(4-hydroxyphenyl), 2,2-bis-(4-hydroxyphenyl)-propane and 2,2-bis-(3,5-dimethyl-4-hydroxyphenyl)-propane and most preferably 2,2-bis-(4-hydroxyphenyl)-propane.

The following are examples of aliphatic, cycloaliphatic and aromatic dicarboxylic acids (b₁) suitable for the synthesis of the polyesters and polyester carbonates according to the invention: oxalic acid, malonic acid, succinic acid, glutaric acid, adipic acid, pimelic acid, suberic acid, azelaic acid, sebacic acid, nonanedicarboxylic acid, decanedicarboxylic acid, dodecanedicarboxylic acid, octadecanedicarboxylic acid, dimethylmalonic acid, dimer fatty acid, 1,4-cyclohexanedicarboxylic acid, tetrahydroterephthalic acid, tetrahydroisophthalic acid, tetrahydrophthalic acid, 3,6-endomethylenetetrahydrophthalic acid, o-, m-, p-phenylenediacetic acid, orthophthalic acid, terephthalic acid, isophthalic acid, tert. butyl isophthalic acid, 3,3'-diphenyldicarboxylic acid, 4,4'-diphenyldicarboxylic acid, 4,4'-benzophenonedicarboxylic acid, 3,4'-benzophenonedicarboxylic acid, 4,4'-diphenyletherdicarboxylic acid, 4,4'-diphenylsulfonedicarboxylic acid, 2,2-bis-(4-carboxyphenyl)-propane, trimethyl-3-phenyl-indane-4,5-dicarboxylic acid.

The polyesters and polyester carbonates according to the invention are preferably produced from aromatic dicarboxylic acids. Among the aromatic dicarboxylic acids, terephthalic acid and/or isophthalic acid are particularly preferred. Terephthalic acid is most particularly preferred.

Preferred polyesters and polyester carbonates according to the invention are those in which 1 to 100 mol-%, preferably 5 to 100 mol-% and more preferably 10 to 100 mol-% of the aromatic diphenols (a) consist of diphenols corresponding to formula (I). Among the polyesters and polyester carbonates in which 10 to 100 mol-% of the aromatic diphenols (a) consist of those of formula (I), those containing 10 to 50 mol-% and 55 to 100 mol-% aromatic diphenols corresponding to formula (I) are preferred, those containing 10 to 40 mol-% and 70 to 100 mol-% aromatic diphenols corresponding to formula (I) are more preferred, those containing 15 to 35 mol-% and 85 to 100 mol-% aromatic diphenols corresponding to formula (I) are most preferred and those containing 100 mol-% aromatic diphenols corresponding to formula (I) are most particularly preferred.

Preferred polyester carbonates according to the invention are those in which the dicarboxylic acids ($b_1$) are present in a quantity of 5 to 98 mol-%, preferably in a quantity of 15 to 95 mol-%, more preferably in a quantity of 20 to 50 mol-% and 60 to 95 mol-% and most preferably in a quantity of 25 to 45 mol-% and 80 to 95 mol-%, based on the sum of the dicarboxylic acids ($b_1$) and the carbonic acid ($b_2$).

The polyesters and polyester carbonates according to the invention can be produced by known methods, for example by polycondensation in homogeneous solution, by melt transesterification and by the two-phase interfacial polycondensation. Melt transesterification is preferred, the two-phase interfacial polycondensation is particularly preferred.

Processes for the production of polyesters and polyester carbonates in homogeneous solution are described, for example, in DE-OS 1 420 475, in U.S. Pat. Nos. 3,169,121 and 4,156,069 and in Polymer Reviews, Vol. 10, Condensation Polymers by Interfacial and Solution Methods, Paul W. Morgan, Interscience Publishers New York, Chapter VIII, pages 325 et seq, Polyesters.

For example, polyesters may be prepared by reaction of dicarboxylic acid dichlorides with aromatic dihydroxy compounds in the presence of pyridine as acid acceptor and pyridine or chlorinated hydrocarbons, such as methylene chloride and chlorobenzene, as solvent.

Polyester carbonates may also be prepared, for example, in homogeneous solution using phosgene, dicarboxylic acid and aromatic dihydroxy compound or phosgene, dicarboxylic acid dichloride and aromatic dihydroxy compound as monomers. The reaction takes place sufficiently quickly at low temperatures, for example at 10° to 40° C.

Melt transesterification processes for the production of polyesters and polyester carbonates include, for example, the acetate process and the phenyl ester process.

The acetate process is described, for example in U.S. Pat. Nos. 3,494,885 and 4,386,186, in European Patents 26 120, 26 121, 26 684, 28 030, 39 845, 91 602, 97 970 and in the monograph by V. V. Korshak and S. V. Vinograda entitled "Polyesters", Pergamon Press, Oxford, 1965 and in the paper by V. V. Korshak and S. V. Vinograda, Chemiefasersymp., Abh. d. Akad. Wiss. Berlin 1 (1963), 355 et seq. In this process, bisacetates of aromatic dihydroxy compounds, such as bisphenol A diacetate, are reacted with dicarboxylic acids, for example aromatic dicarboxylic acids, such as isophthalic acid and terephthalic acid, in the melt, generally at temperatures of 200° to 400° C., with elimination of acetic acid to form aromatic polyesters. Auxiliary solvents such as, for example, diphenyl ether, substituted cyclohexanes and decahydronaphthalene may be used to improve the melt flow of the polyester during the process and to prevent sublimation of the dicarboxylic acid.

The reaction may optionally be catalyzed, for example with compounds of alkali and alkaline earth metals, Ti, Zn, Sn, Sb and Mn. The condensation can also be conducted, particularly in the case of crystallizing polyesters, in the melt only to the stage of a still free-flowing prepolymer which is then subjected to solid-phase condensation below its melting point until the desired degree of condensation is reached. In this case, the synthesis of the polymer is generally completed under reduced pressure at a temperature only just below its melting point with further elimination and removal of acetic acid.

The phenyl esters processed for the production of aromatic polyesters and polyester carbonates is described, for example in U.S. Pat. Nos. 4,661,580, 4,680,371, 4,680,372, EP 79 075, 146,887, 156 103, 234 913, 234 914, 240 301 and in DE-AS 1 495 626 and 2 232 877.

In this process, aromatic dihydroxy compounds, such as bisphenol A for example, are reacted with aromatic dicarboxylic acid esters, such as isophthalic acid diphenyl ester and terephthalic acid diphenyl ester, in the melt, generally at temperatures of 200° to 400° C., with elimination of phenol to form aromatic polyesters. To produce polyesters by this process, aromatic dihydroxy compounds, dicarboxylic acids and diesters of carbonic acid, such as diphenyl carbonate, may also be reacted as starting materials. In this case, the phenyl esters of the dicarboxylic acids required for the reaction are formed as an intermediate stage with elimination of $CO_2$ and phenol.

To produce polyester carbonates by the phenyl ester process, diesters of carbonic acid, such as diphenyl carbonate, are generally used in addition to the diesters of the dicarboxylic acids. However, it is also possible to use only aromatic dihydroxy compounds, dicarboxylic acids and diphenyl carbonate for the production of polyester carbonates. In the production of polyester carbonates, the molar total quantity of dicarboxylic diesters and dicarboxylic acid used is generally smaller than the total molar quantity of bisphenols used. Catalysts can also be used in the phenyl ester process to accelerate the condensation reaction, auxiliary solvents may be present and the prepolymer may be subjected to solid-phase postcondensation. The catalysts and auxiliary solvents are the same as already described for the acetate process.

The two-phase interfacial polycondensation process for the production of polyesters and polyester carbonates is described, for example, in European patents 68 014, 88 322, 134 898, 151 750, 182 189, 219 708, 272 426, in DE-OS 2 940 024, 3 007 934, 3 440 020 and in Polymer Reviews, Vol. 10, Condensation Polymers by Interfacial and Solution Methods, Paul W. Morgan, Interscience Publishers New York 1965, Chapter VIII, page 325, Polyesters.

Aromatic dihydroxy compounds, dicarboxylic acid dichlorides and phosgene are preferably used as starting components for the production of the polyesters and polyester carbonates according to the invention.

Terephthalic acid and/or isophthalic acid may also be used in the two-phase interfacial process, in which case dicarboxylic acid chlorides or dichlorides are formed as an intermediate stage using phosgene.

In the two-phase interfacial process, the polycondensate forms at the phase interface of an aqueous-alkaline solution and the water-immiscible organic solvent. For example, the aromatic dihydroxy compound, dissolved in aqueous alkali as diphenolate, is reacted while stirring with the dicarboxylic acid dichloride and optionally phosgene, dissolved in the organic solvent. The polyester formed or the polyester carbonate formed dissolve in the organic solvent. Where dicarboxylic acid dichloride and phosgene are used, i.e. where polyester carbonates are being produced, for example dicarboxylic acid chloride alone can initially be reacted with the alkali bisphenolate and the phosgene required to complete the polycondensation can be added thereafter. It is also possible to react the dicarboxylic acid dichloride and part of the phosgene required together with the bisphenolate and then to add the remainder of the phosgene required. The polycondensation reaction is generally carried out in the presence of a catalyst. The catalyst, which is described in detail hereinafter, may be added for example when the dicarboxylic acid chlorides and the phosgene have already been reacting with the alkali bisphenolate for a certain time. However, it may also be added—at least partly—at the beginning of the reaction. However, different catalysts may also be used in one and the same condensation reaction, being added at different times. Generally molecular weight of the polymer is adjusted by means of chain terminating agents. Branching agents for example can be used to obtain certain properties, for example structural viscosity. Antioxidants may also be used in the reaction, for example to obtain very light-colored polycondensates.

Suitable water-immiscible organic solvents, are, for example, chlorinated hydrocarbons, such as chloroform, dichloroethane, tri- and tetrachloroethylene, tetrachloroethane, dichloromethane, chlorobenzene and dichlorobenzene, and also non-chlorinated hydrocarbons, such as toluene and xylene. Chlorobenzene or dichloromethane or mixtures thereof are preferably used.

The chain terminators used are for example secondary amines, phenols and acid chlorides. Preferred chain terminators are phenols, such as phenol and alkyl phenol, more preferably those containing $C_{1-12}$ alkyl groups, such as p-tert. butyl phenol, m- and p-3,5-dimethyl heptyl phenol and m- and p-1,1,3,3-tetramethyl butyl phenol, and also hydroxydiphenyl and p-cumenyl phenol. p-1,1,3,3-tetramethyl butyl phenol (p-isooctyl phenol) is most particularly preferred.

Small quantities, preferably 0.05 to 3.0 mol-% (based on diphenols used), of trifunctional or more than trifunctional compounds, particularly those containing three or more than three phenolic hydroxyl groups, are optionally used in known manner as branching agents to obtain branched polyesters or polyester carbonates. Some of the compounds containing three or more than three phenolic hydroxyl groups which may be used include phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Suitable catalysts are, for example, tertiary amines and/or phase transfer catalysts such as, for example, quaternary ammonium and phosphonium compounds and/or crown ethers. Preferred catalysts are, for example, N-ethyl piperidine, tetrabutyl ammonium bromide and/or triphenyl benzyl phosphonium bromide.

The polyesters and polyester carbonates according to the invention generally have average molecular weights $\overline{M}w$ of at least 10,000, preferably in the range from 10,000 to 400,000 and more preferably in the range from 15,000 to 80,000 and from 100,000 to 250,000.

Typical additives such as, for example, stabilizers, mold release agents, pigments, flameproofing additives, antistatic agents, conductivity additives, fillers and reinforcing materials may be added in typical quantities to the polyesters and polyester carbonates according to the invention before or during their processing to moldings.

More specifically, suitable additives are, for example, graphite, carbon black, metal fibers, metal powders, kieselguhr, quartz, kaolin, clays, $CaF_2$, $CaCO_3$, aluminium oxides, glass fibers, C fibers, ceramic fibers and inorganic pigments; suitable mold release agents are, for example, esters of polyhydric alcohols with long-chain carboxylic acids, such as glycerol stearates, pentaerythritol tetrastearate and trimethylol propane tristearate.

The polycarbonates of this invention can be processed to moldings by any of the methods typically used for thermoplastics, including for example injection molding, extrusion, blow molding, rotational molding, hot press molding and thermoforming, the above-mentioned additives for example being added during processing. Moldings are understood to be, for example, injection-molded articles of varying geometry, extruded articles, such as profiles, tubes, sheets, fibers and films, blow-molded articles, such as bottles, containers and lighting elements, and thermoformed articles.

The polyesters according to the invention having molecular weights $\overline{M}_w$ of 15,000 to 80,000 are preferably processed from the melt while those having molecular weights $\overline{M}_w$ of 100,000 to 250,000 are preferably processed from solution.

The polyesters and polyester carbonates according to the invention, more particularly those having molecular weights $\overline{M}w$ of 100,000 to 250,000, are particularly suitable for the production of high-quality cast films because they process particularly well (ready removability from the casting drum, minimal electrostatic charging during removal from the casting drum, surface uniformity) and show particularly good properties, even with film thicknesses of 0.5 to 200 μm, preferably 0.5 to 100 μm, more preferably 1 to 25 μm and most preferably 2 to 10 μm. By virtue of their minimal shrinkage at high temperatures, they are particularly suitable as films resistant to solder baths and, by virtue of their favorable electrical insulating properties, they may be used in particular as electrical insulating films, particularly for capacitor films and for cable insulations. The properties of the films may be further improved by stretching (for example monoaxial or biaxial stretching).

The films—obtainable for example by extrusion from the melt or by casting from solution—may also be processed together with other films to form composite films. In addition, the polycarbonates according to the invention may also be used in other composite materials, for example in combination with fibers and other polymers.

By virtue of their high heat resistance, thermal oxidation stability and flame resistance, the polyesters and polyester carbonates according to the invention are particularly suitable for electrical appliances (particularly at high temperatures), in the lighting fixtures and for components used in the engine compartment of automobiles. Thus, electrical insulators and also lamp holders, reflectors for lamps and holders for use in engine compartments may advantageously be made from them.

EXAMPLE 1

Polyester 80.8 g NaOH (2.02 mol), 4.52 g N-ethyl piperidine (0.04 mol) and 394 g (1 mol) 3,8-dihydroxy-5a,10b-diphenylcoumarano-2',3',2,3-coumarane, hereinafter referred to as DC, were dissolved while stirring in 10 l water. 5 l methylene chloride containing 203 g dissolved terephthalic acid dichloride (1 mol) were then added to the resulting solution with continued stirring, followed by stirring for another hour with the temperature kept at 20° to 35° C. The organic phase was then separated off and the bisphenolate-free aqueous alkaline phase was discarded. The organic phase was then washed with dilute aqueous phosphoric acid and then repeatedly with distilled water until it was free from electrolyte. Evaporation of the methylene chloride from the organic phase left a colorless polyester which was freed in vacuo from residues of methylene chloride over a period of 15 hours at 130° C. Relative viscosity $\eta_{rel}=2.231$ (as measured in a methylene chloride solution at 25° C., c=5 g/l solution). Differential thermoanalysis showed a glass transition temperature Tg=351° C.

EXAMPLE 2

Polyester

Example 1 was repeated with the following changes: Terephthalic acid dichloride 207.5 g (1.022 mol). NaOH 82.6 g (2.064 mol). 9.1 g (0.044 mol) p-(1,1,3,3-tetramethylbutyl)-phenol was additionally used (common solution with terephthalic acid dichloride in methylene chloride). Relative viscosity $\eta_{rel}=1.306$ (as measured in a methylene chloride solution at 25° C., c=5 g/l solution). Differential thermoanalysis showed Tg=346° C.

EXAMPLE 3

Polyester

Example 1 was repeated with the following change: The terepthalic acid dichloride was replaced by iso-phthalic acid dichloride (same quantity); $\eta_{rel}=1.957$ (as measured in a methylene chloride solution at 25° C., c=5 g/l solution). Differential thermoanalysis showed Tg=328° C.

EXAMPLE 4

Polyester

Example 2 was repeated with the following change: 0.5 mol of the DC used was replaced by 0.5 mol (114 g) 2,2-bis-(4-hydroxyphenyl)-propane; $\eta_{rel}=1.314$ (as measured in a methylene chloride solution at 25° C., c=5 g/l solution). Differential thermoanalysis showed Tg=294° C.

EXAMPLE 5

Polyester Carbonate 5 l methylene chloride containing 182.7 g (0.90 mol) dissolved terephthalic acid dichloride were added dropwise with stirring at 25° to 35° C. to a solution of 80.8 g (2.02 mol) NaOH, 4.52 g (0.04 mol) N-ethyl piperidine and 394 g (1.0 mol) DC in 10 l water. After stirring for one hour, 128 g (3.2 mol) NaOH were added in the form of a concentrated solution and 40 g (0.40 mol) phosgene were introduced, followed by stirring for 30 minutes. Working up as in Example 1 produced a polyester carbonate having a $\eta_{rel}$ of 2.736 (25° C., c=5 g/l solution in methylene chloride) and a glass transition temperature of 345° C.

EXAMPLE 6

Polyester Carbonate APEC 90 T 50 DC 50

Example 5 was repeated with the following changes: The 1 mol DC was replaced by a mixture of 197 g (0.50 mol) DC and 114 g (0.50 mol) bisphenol A and the 0.90 mol terephthalic acid dichloride was replaced by a mixture of 91.4 g (0.45 mol) terephthalic and 91.4 g (0.45 mol) isophthalic acid dichloride additionally containing 9.1 g (0.044 mol) isooctyl phenol. Working up as in Example 1 gave a polyester carbonate having $\eta_{rel}=1.312$ (25° C., c=5 g/l solution in CH$_2$Cl$_2$) and a glass temperature of 282° C.

We claim:

1. A polymeric resin selected from the group consisting of polyester and polyester carbonate prepared by reacting (a) an aromatic diphenol, and (b$_1$) 0.1 to 100 mol-% of at least one member selected from the group consisting of an aliphatic dicarboxylic acid, cycloaliphatic dicarboxylic acid and aromatic dicarboxylic acid, and (b$_2$) 0 to 99.9 mol-% carbonic acid, said mol-% being relative to the total molar amount of b$_1$+b$_2$, wherein said aromatic diphenol contains 0.1 to 100 percent of 3,8-dihydroxy-5a,10b-diphenyl coumarano-2',3',2,3-coumarane corresponding to

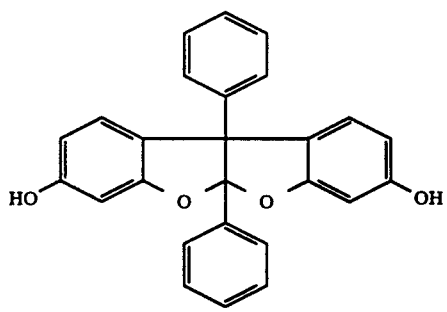

said percent being relative to the molar amount of said diphenol.

* * * * *